United States Patent [19]

Yamaguchi et al.

[11] Patent Number: 5,148,290
[45] Date of Patent: Sep. 15, 1992

[54] VIDEO SIGNAL RECORDING/REPRODUCTION DEVICE HAVING DROPOUT COMPENSATION FUNCTION

[75] Inventors: Takayoshi Yamaguchi, Nagareyama; Masaru Yoshida, Kashiwa, both of Japan

[73] Assignee: Sharp Kabushiki Kaisha, Osaka, Japan

[21] Appl. No.: 641,148

[22] Filed: Jan. 15, 1991

[30] Foreign Application Priority Data

Jan. 17, 1990 [JP] Japan .................................... 2-9067

[51] Int. Cl.[5] .............................................. H04N 9/88
[52] U.S. Cl. .................................... 358/314; 358/327; 360/38.1
[58] Field of Search ............... 358/314, 327, 336, 340, 358/310, 320, 337; 360/38.1, 36.1, 36.2

[56] References Cited

U.S. PATENT DOCUMENTS 4,628,369 12/1986 Ichinoi et al. ........................ 358/314
4,731,675 3/1988 Tachibana et al. ................. 358/336

Primary Examiner—Dale M. Shaw
Assistant Examiner—Robert Chevalier
Attorney, Agent, or Firm—David G. Conlin; Robert F. O'Connell

[57] ABSTRACT

In a VTR for a TCI signal, time-base correction and TCI decode processing are applied to the reproduced TCI signal of each channel and also to the corresponding dropout signals. According to the resulting dropout signal for luminance signal and the dropout signal for chrominance signal, the dropout section of a luminance signal and the dropout section of a chrominance signal are respectively compensated for. As a result, a luminance signal may have the data of the dropout section compensated for with data of a highly correlated luminance signal of 1H before and 1H after the horizontal period where dropout occurs. The dropout compensation circuits can be simplified since the luminance and chrominance signals are processed by separate circuits.

4 Claims, 7 Drawing Sheets

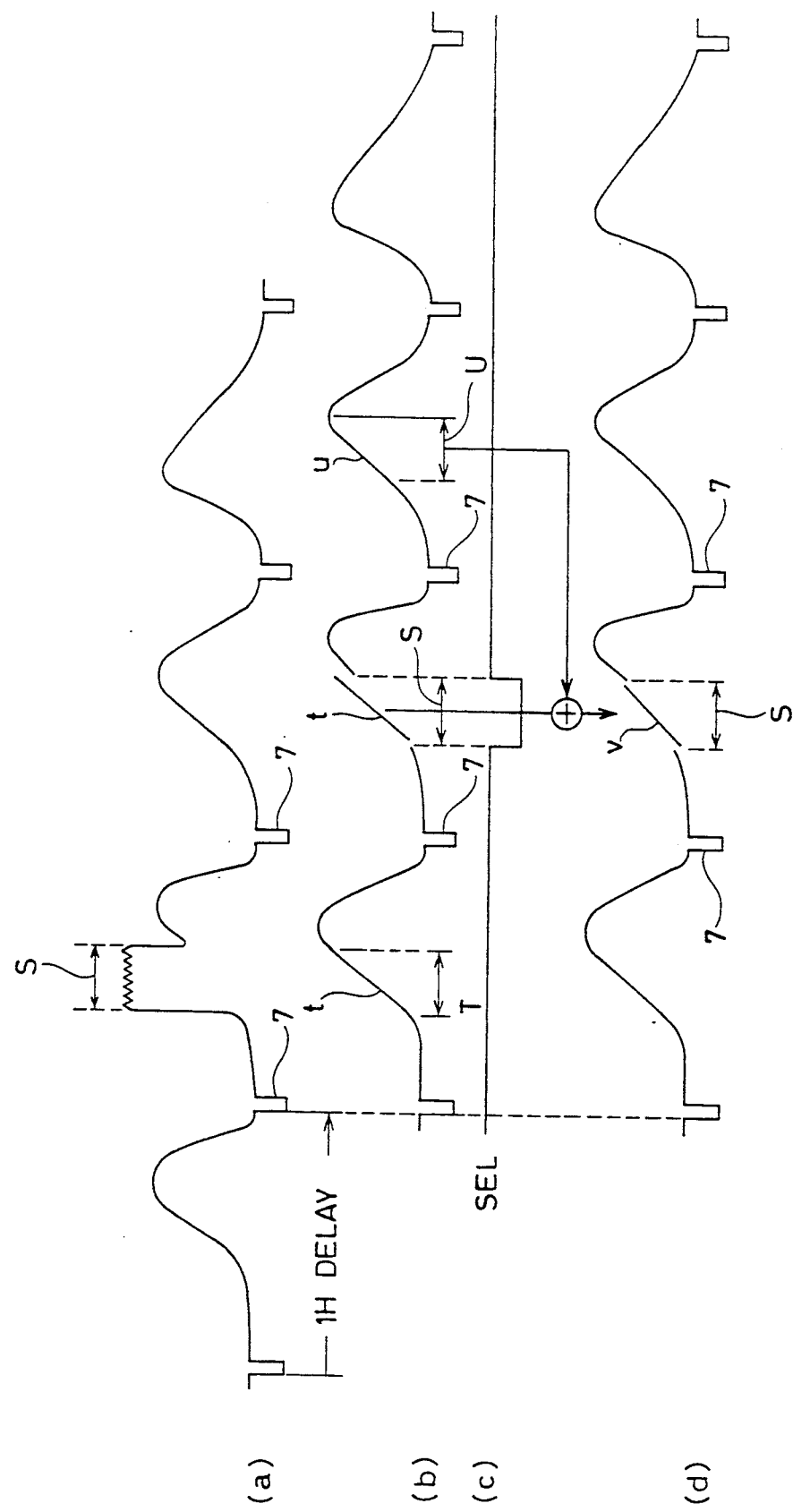

FIG. 7

(a) chA TCI SIGNAL

| C1N | YN | C2N | YN+2 | C1N+2 | YN+4 | C2N+2 |

(b) chB TCI SIGNAL

| C1N+1 | YN+1 | C2N+1 | YN+3 | C1N+3 | YN+5 | C2N+3 |

(c) OUTPUT OF 1ST LINE MEMORY FOR Y SIGNAL

| YN-2 | | YN | | YN+2 | | YN+4 |

(d) OUTPUT OF 2ND LINE MEMORY FOR Y SIGNAL

| | YN-1 | | YN+1 | | YN+3 | |

(e) OUTPUT OF MUX FOR Y SIGNAL

| YN-2 | YN-1 | YN | YN+1 | YN+2 | YN+3 | |

(f) OUTPUT OF LINE MEMORY FOR CHROMINANCE SIGNAL

| C1N-1 | C2N-1 | C1N | C2N | C1N+1 | C2N+1 | C1N+2 |

VIDEO SIGNAL RECORDING/REPRODUCTION DEVICE HAVING DROPOUT COMPENSATION FUNCTION

BACKGROUND OF THE INVENTION

1. Field of the Invention

The present invention relates generally to video signal recording/reproduction devices, and more particularly, to a video signal recording/reproduction device such as a video tape recorder (VTR) for a high definition television comprising dropout compensation function for compensating for dropouts of reproduced video signals.

2. Description of the Background Art

In recent years, the demand for high quality television image is rapidly increasing, whereby the so-called high definition television system having the number of horizontal scanning lines increased significantly in comparison with a conventional television system is being developed to meet these requirements. The development of associated equipments is also in advance to implement the high definition television system. One such equipment is a VTR employing a TCI (Time Compressed Integration) signal as a recording signal format. This TCI signal is obtained by time-base processing the base band signals of a chrominance signal and a luminance signal to time-divisionally multiplex these signals within the same horizontal period. Such VTRs are implemented to FM record the TCI signal obtained by encoding the chrominance signal and the luminance signal in the above described manner on a magnetic tape as a recording medium, at the time of recording, and to decode the TCI signal reproduced from the magnetic tape to restore the chrominance signal and the luminance signal at the time of reproduction.

Missing reproduced video signals in some sections, i.e. dropout of reproduced video signals, due to dust and scratch on the recording medium such as a magnetic tape, often occurs in a video signal recording/reproduction device such as a VTR. Video signal recording/reproduction devices are generally provided with a device compensating for dropout. One such conventional dropout compensation device is disclosed in Japanese Patent Laying-Open No. 63-232778, for example.

FIG. 1 is a block diagram schematically showing a general dropout compensation device adopted in a video signal recording/reproduction device such as a VTR. Referring to FIG. 1, a video signal reproduced from a recording medium such as a magnetic tape (not shown) is converted into a digital data by an A/D converter not shown and provided to a 1H line memory 1 and to one input of an adder 2. A dropout pulse $\overline{DO}$, is applied to a 1H memory 3 and an inverter 4 from a dropout detector not shown, which indicates whether there is dropout in the reproduced video signal. This dropout pulse $\overline{DO}$, is at a high level when there is no dropout in the reproduced video signal, and at a L level when there is dropout. Dropout pulse $\overline{DO}$, is inverted by inverter 4 to be applied to 1H line memory 1 as a write enable signal $\overline{WE'}$.

When there is no dropout in the reproduced video signal, signal $\overline{WE'}$ is at a L level, whereby the reproduced video signal is written into 1H line memory 1. When there is dropout in the reproduced video signal, signal $\overline{WE'}$ is at the H level, whereby the writing of the reproduced video signal into 1H line memory 1 is inhibited during that period. Regarding the reproduced signal written into 1H line memory 1, the data of the period where dropout occurs is replaced by data of a corresponding period of a reproduced video signal of 1H before held in 1H line memory 1.

The reproduced video signal is delayed by 1H by 1 line memory 1 and applied to one contact 5a of a switch circuit 5 and to the other input of adder 2. Meanwhile, dropout pulse $\overline{DO}$, is delayed by 1H by 1H memory 3, and applied to a control input of switch circuit 5 as a selecting signal SEL. During the period where there is no dropout in the reproduced video signal, i.e. the period where signal SEL is at the H level, switch circuit 5 is connected to contact 5a, whereby the reproduced video signal delayed by 1H is directly output from 1H line memory 1 through switch circuit 5. During the period where there is drop out in the reproduced video signal, i.e. the period where signal SEL is at the L level, switch circuit 5 is connected to contact 5b. As a result, the reproduced video signal supplied from 1H line memory 1 and the reproduced video signal currently being written into 1H line memory 1 are added to each other by adder 2, and the amplitude of the resultant signal is attenuated to ½ by an attenuator 6. This means that the average value of the signals in the corresponding sections in the reproduced signals of 1H before and 1H after the horizontal period where dropout occurs is output from switch circuit 5.

FIG. 2 is a waveform chart explaining the operation of the dropout compensation device of FIG. 1. Referring to FIG. 2, (a) represents the reproduced video signal applied to 1H line memory 1 and to one input of adder 2. The section marked "S" indicates the dropout. A reference numeral "7" indicates the horizontal synchronizing signal.

The reproduced video signal is delayed by 1H, as shown in FIG. 2 (b), by being stored in 1H line memory 1. The writing of the reproduced video signal into 1H line memory 1 is inhibited during period S where dropout occurs. The data of that section is replaced with data t of the corresponding section T in the reproduced video signal of 1H before.

Then, data t of period S in the reproduced video signal delayed by 1H, and data u of the corresponding section U of the currently reproduced video signal, i.e. the reproduced video signal of 1H after the horizontal period where dropout occurs, are added to each other and averaged according to selecting signal SEL shown in FIG. 2 (c). The dropout of period S is compensated for by the average value v obtained by the above mentioned adding and averaging, as shown in FIG. 2 (d).

A VTR of high definition television system generally carries out recording and reproduction of the TCI signal for each channel by dividing the TCI signal into 2 channels. When dropout is compensated for each channel in such VTRs according to the process shown in FIGS. 1 and 2, an average value of data of 2H before and 2H after the horizontal period where dropout occurs is used for compensation. This means that the correlation between the reproduced video signals is reduced to deteriorate the quality of the picture, in comparison with the case where compensation is carried out using the average value of data of 1H before and 1H after the horizontal period where dropout occurs.

A possible consideration to solve this problem is to compensate for dropout using data of 1H before and 1H after the horizontal period where dropout occurs by substituting data between the two channels of the reproduced TCI signal. However, guard bandless recording of two channels is susceptible to dropout generation in both channels at the same time. Dropout cannot be compensated for sufficiently unless relatively large capacity memories such as frame memories or field memories are used.

There was also a problem that processing circuitry for dropout compensation becomes complicated because the TCI signal with the chrominance signals line sequential processed has different distances upon the time base of data used for dropout compensation regarding the chrominance data section and the luminance data section.

SUMMARY OF THE INVENTION

An object of the present invention is to provide a video signal recording/reproduction device for a TCI signal suppressing the deterioration of picture quality associated with dropout compensation.

Another object of the present invention is to provide a video signal recording/reproduction device for a TCI signal having simplified dropout compensation circuit structure.

Briefly stated, the present invention is a video signal recording/reproduction device for recording/reproducing a TCI signal of two channels obtained by time-divisionally multiplexing a luminance signal and a line sequential processed chrominance signal within one horizontal period; including a TCI signal reproducing circuit, a dropout detecting circuit, a time-base correcting circuit, a decode circuit for TCI signal, a dropout compensation circuit for luminance signal, and a dropout compensation circuit for chrominance signal. The TCI signal reproducing circuit reproduces the TCI signal of each channel from the recording medium. The dropout detecting circuit detects the section in the reproduced TCI signal of each channel where dropout occurs to generate a dropout signal indicating the dropout section. The time-base correcting circuit corrects the time-bases of the reproduced TCI signal of each channel and the corresponding dropout signals. The decode circuit for TCI signal decodes the reproduced TCI signal having the time-base corrected to restore a luminance signal and a chrominance signal. The decode circuit also decodes the dropout signals having their time-bases corrected to generate a dropout signal for luminance signal indicating the dropout section of a luminance signal, and a dropout signal for chrominance signal indicating the dropout section of a chrominance signal. The dropout compensation circuit for luminance signal compensates for the dropout section of the luminance signal restored by the decode circuit, according to the dropout signal for luminance signal. The dropout compensation circuit for chrominance signal compensates for the dropout section of the chrominance signal restored by the decode circuit, according to the dropout signal for chrominance signal.

The main advantage of the present invention lies in that the dropout sections of a luminance signal and a chrominance signal restored by decoding a TCI signal are respectively compensated according to a dropout signal for luminance signal and a dropout signal for chrominance signal generated by time-base correcting and TCI decoding the dropout signal as for a reproduced TCI signal, whereby the luminance signal can be compensated for dropout with highly correlated luminance signal data of 1H before and 1H after the horizontal period where dropout occurs, to suppress deterioration in picture quality.

Another advantage of the present invention lies in that each structure of the dropout compensation circuit for luminance signal and the dropout compensation circuit for chrominance signal are simplified because dropout compensation is respectively carried out after the reproduced TCI signal is decoded and divided into a luminance signal and a chrominance signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2, consisting of (a)-(d), is a waveform chart explaining the operation of the dropout compensation circuit of FIG. 1.

FIG. 7, consisting of (a)-(f), is a timing chart schematically showing the principle of the decode process of the TCI decoder of FIG. 5.

DESCRIPTION OF THE PREFERRED EMBODIMENT

Figure 3:
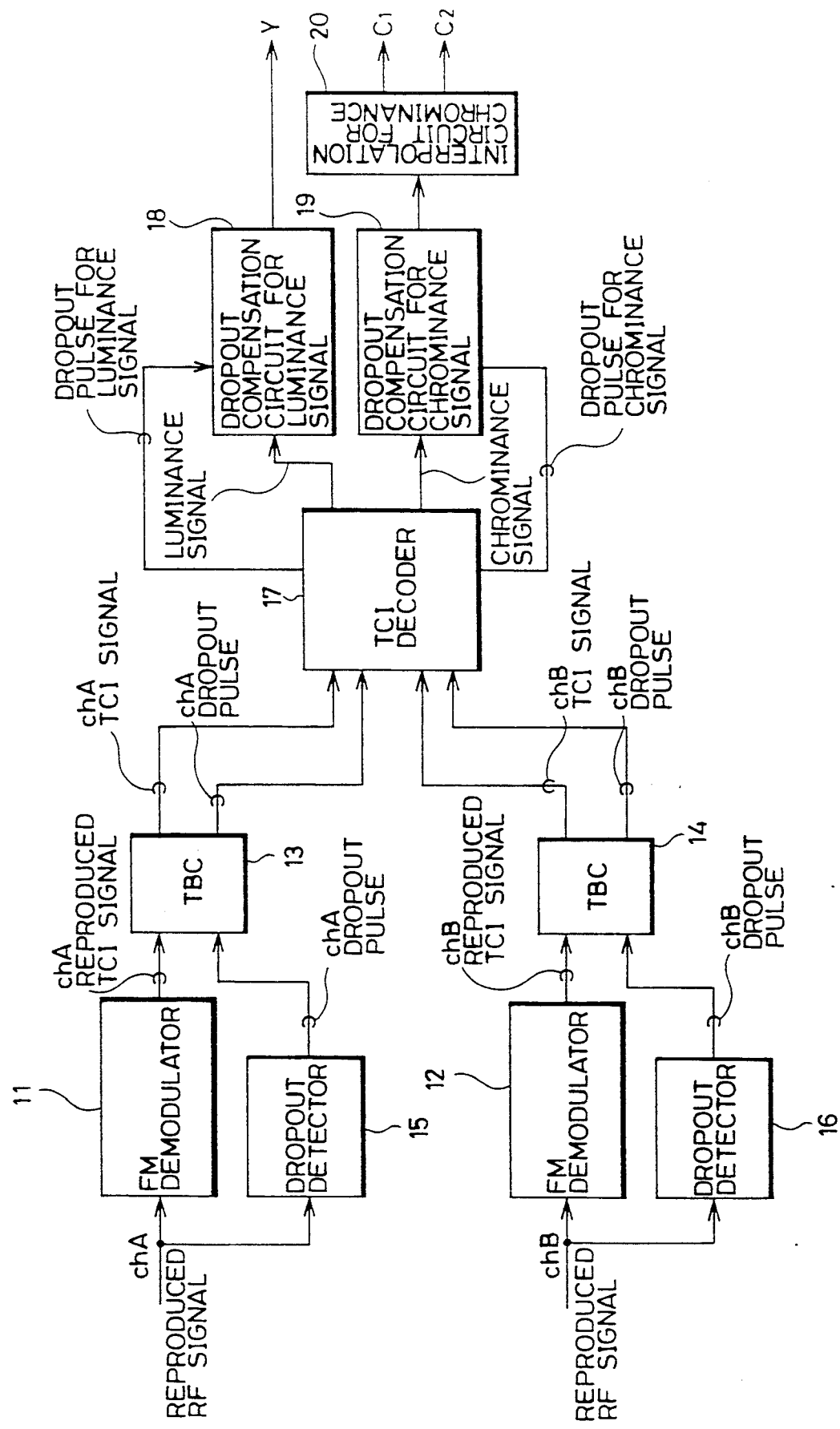
FIG. 3 is a block diagram showing a reproduced signal processing system of a VTR according to an embodiment of the present invention.

FIG. 3 is a block diagram showing a reproduced signal processing system of a VTR of an embodiment of the present invention. This VTR is for high definition televisions according to 2-channel divided TCI signal recording systems. The reproduction of a FM-modulated TCI signal recorded on a magnetic tape not shown will be explained hereinafter. It is assumed that the chrominance signals are line sequential processed in being encoded into a TCI signal.

Referring to FIG. 3, RF signals of two channels reproduced from a magnetic tape by magnetic heads not shown, i.e., the reproduced RF signals of channel A (chA) and channel B (chB) are FM demodulated by FM demodulators 11 and 12 to result in analog reproduced TCI signals, respectively. The reproduced TCI signals of channel A and channel B are respectively applied to TBCs (Time Base Corrector) 13 and 14 for time-base correction.

The reproduced RF signals of channel A and channel B are also provided to dropout detectors 15 and 16, respectively. Each dropout detector detects the section where dropout occurs according to the envelope of the applied reproduced RF signal to generate a dropout pulse as a dropout signal indicating such a dropout section. Such a dropout pulse is a signal which is at a L level during the period of dropout occurrence, and at a H level otherwise. The dropout pulses of channel A and channel B are applied to TBCs 13 and 14, respectively.

As will be explained in detail later, each of TBCs 13 and 14 converts the applied reproduced TCI signal of the corresponding channel into a digital data by an A/D converter contained therein according to a clock signal synchronized with the reproduced TCI signal, to write the same into a contained memory having a storage capacity of several lines for example. Then, digital data corresponding to the reproduced TCI signal is read out from that memory according to a stable reference clock signal, whereby time-base correction of the reproduced TCI signal is carried out.

TBCs 13 and 14 also carry out the time-base correction with respect to the dropout pulses of the corresponding channel A and channel B, similarly to the above-mentioned reproduced TCI signal. Because A/D conversion as in the case of the above-mentioned reproduced TCI signal is not necessary in the case of a dropout pulse, synchronization with the reproduced TCI signal is performed by writing the dropout pulse into the contained memory according to the clock signal synchronized with the reproduced TCI signal.

The digital TCI signals and dropout pulses having their time-bases corrected by TBCs 13 and 14 are provided to a TCI decoder 17. TCI decoder 17 decodes the TCI signals of channel A and channel B alternately provided from TBCs 13 and 14 to restore a luminance signal and a chrominance signal.

Furthermore, TCI decoder 17 decodes the dropout pulses of channel A and channel B to generate a dropout pulse for luminance signal indicating the dropout section of a luminance signal and a dropout pulse for chrominance signal indicating the dropout section of a chrominance signal.

The luminance signal and the dropout pulse for luminance signal provided from TCI decoder 17 are applied to a dropout compensation circuit 18 for luminance signal, where dropout compensation is carried out for the luminance signal to provide a luminance signal Y.

Meanwhile, the chrominance signal and the dropout pulse for chrominance signal provided from TCI decoder 17 are applied to a dropout compensation circuit 19 for chrominance signal, where dropout compensation for the chrominance signal is carried out. This chrominance signal is applied to an interpolation circuit for chrominance 20, where the necessary interpolation process is carried out for the chrominance signal. This chrominance signal is divided and output as chrominance signals C1 and C2.

Figure 4:
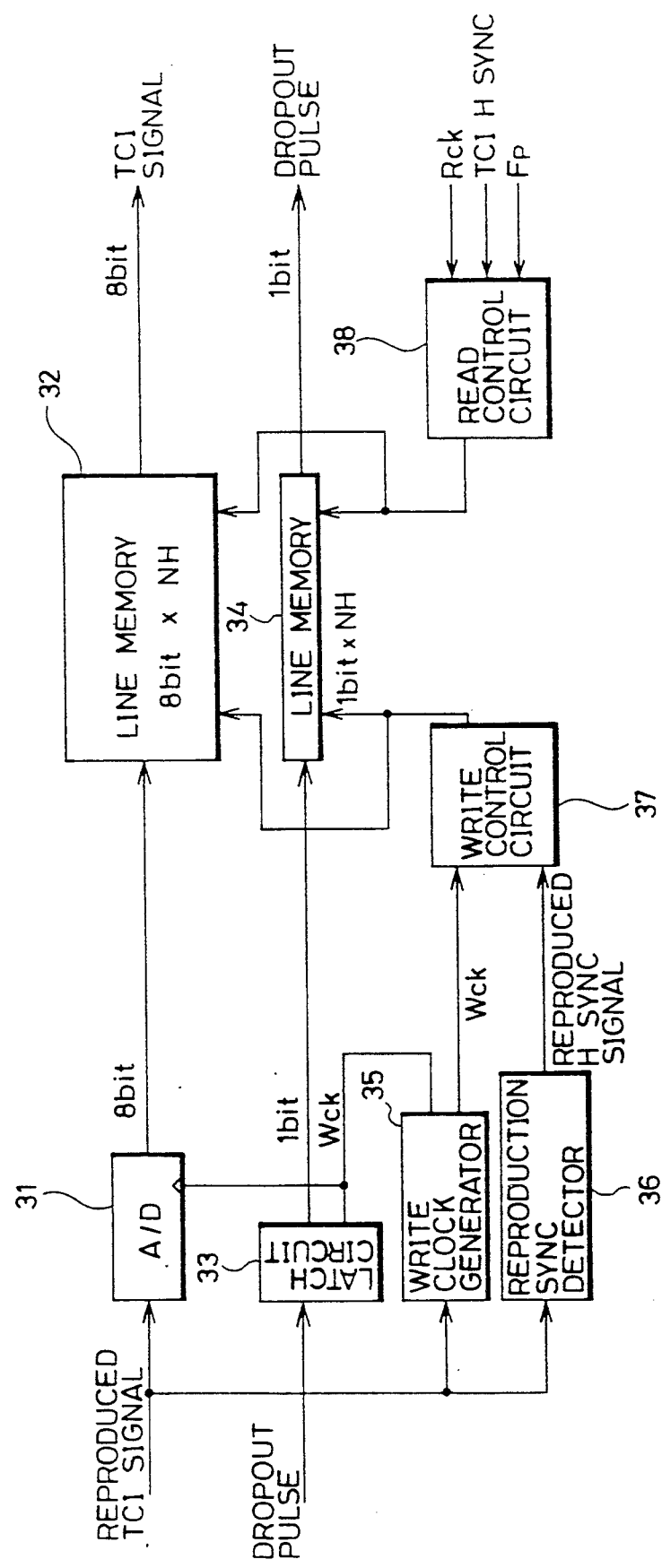
FIG. 4 is a block diagram showing the structure of the TBC of FIG. 3.

FIG. 4 is a block diagram showing in detail each structure of TBCs 13 and 14. Each of TBCs 13 and 14 comprises a line memory 32 of 1 word 8-bit structure for reproduced TCI signal capable of asynchronous reading and writing, and a line memory 34 of 1 word 1-bit structure for dropout pulses capable of asynchronous writing and reading.

Referring to FIG. 4, the reproduced TCI signal provided from the corresponding FM demodulator 11 or 12 is applied to an A/D converter 31, a write clock generator 35, and a reproduction synchronization detector 36. The write clock generator 35 generates a write clock signal $W_{ck}$ according to the reproduced TCI signal, and applies the same to A/D converter 31, a latch circuit 33, and a write control circuit 37. The reproduction synchronization detector 36 separates a horizontal synchronizing signal from the reproduced TCI signal, and applies the same to write control circuit 37.

A/D converter 31 is responsive to a write clock signal $W_{CK}$ from write clock generator 35 to convert the reproduced TCI signal into a digital signal. This digital signal is applied to line memory 32 for time-base correction. The digital TCI signal is written into line memory 32 according to a control signal from write control circuit 37.

A read control circuit 38 generates a control signal according to a readout clock signal $R_{CK}$, a TCI horizontal synchronizing signal and a frame pulse $F_P$ from a reference signal generator not shown. In response to this control signal, a digital data corresponding to the reproduced TCI signal is readout from line memory 32, whereby time-base correction is carried out for the reproduced TCI signal.

The dropout pulse provided from the corresponding dropout detectors 15 or 16 is applied to latch circuit 33 to be latched according to write clock signal $W_{CK}$. This causes the dropout pulse to be synchronized with the reproduced TCI signal, and is written into line memory 34 according to a control signal from write control circuit 37. The dropout pulse is read out from line memory 34 according to a control signal from read control circuit 38, whereby time-base correction of the dropout pulse is carried out.

Figure 5:
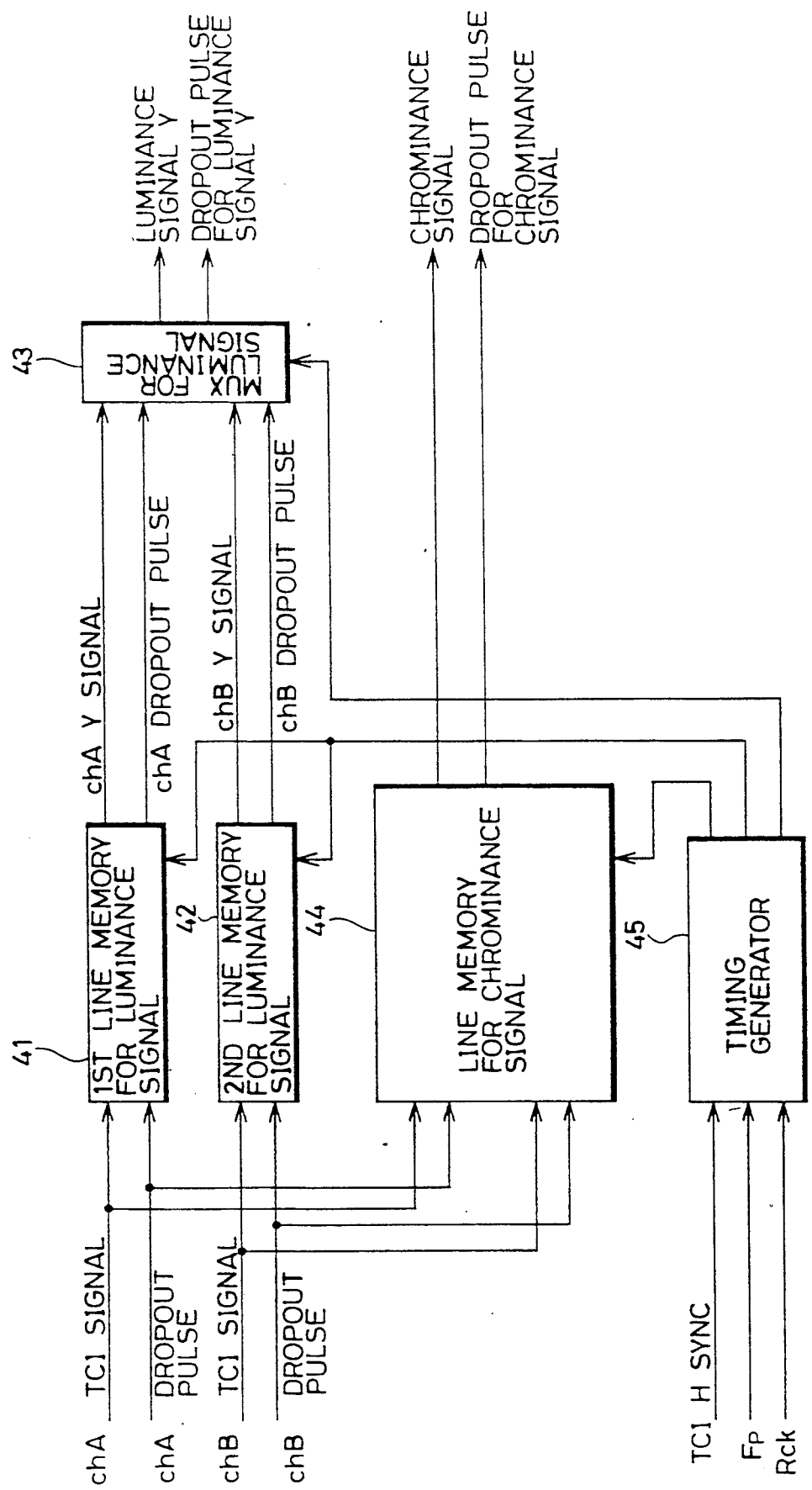
FIG. 5 is a block diagram showing the structure of the TCI decoder of FIG. 3.
Figure 6:
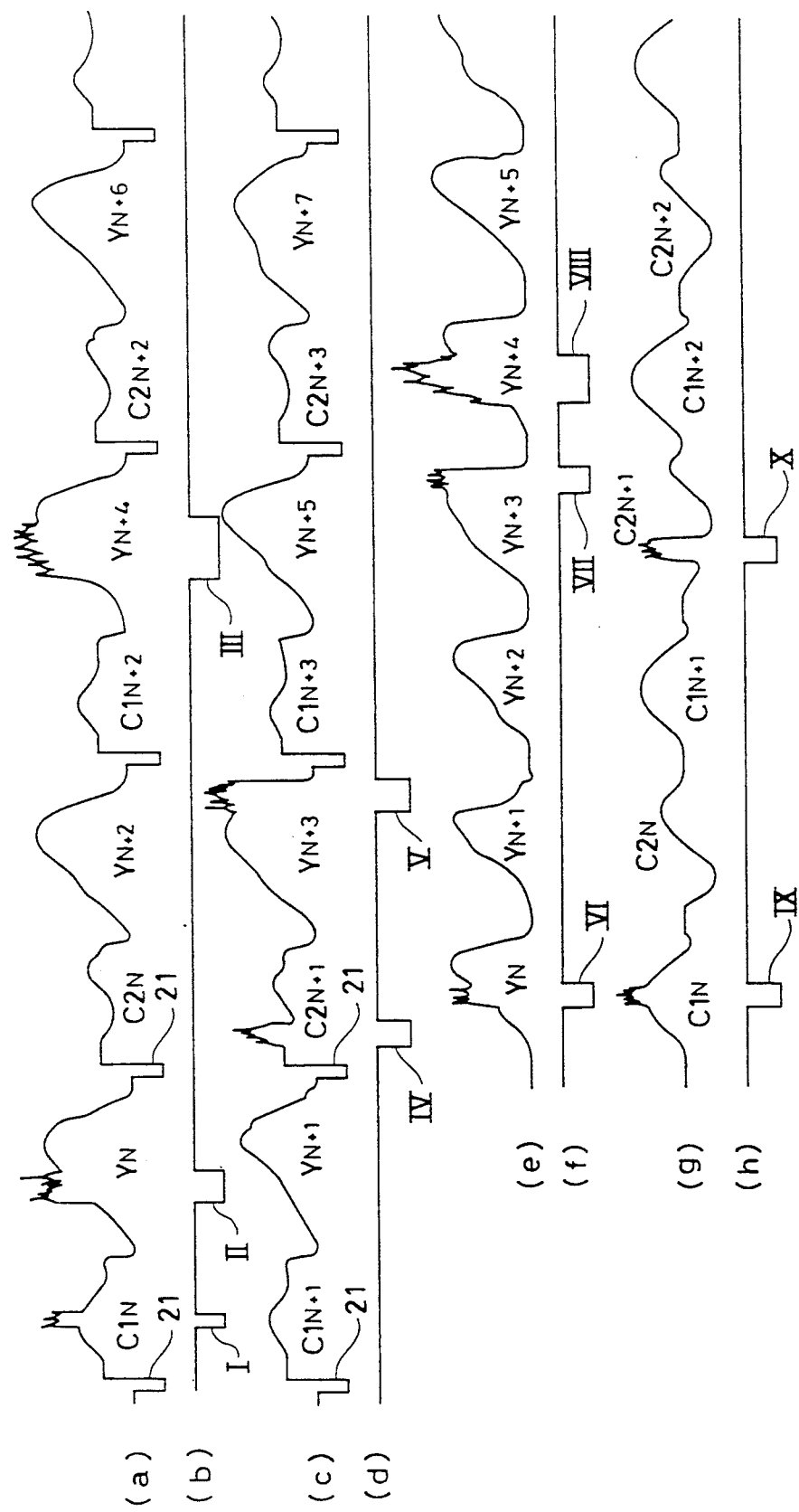
FIG. 6, consisting of (a)-(h), is a waveform chart specifically showing the decode processing manner of the TCI decoder of FIG. 5.

FIG. 5 is a block diagram showing in detail the structure of the TCI decoder 17 of FIG. 3. FIG. 6 is a waveform chart specifically showing the decode processing of the TCI decoder 17, whereas FIG. 7 is a timing chart schematically showing the principle of the decode process.

In FIGS. 6 and 7, the TCI signal is constituted by chrominance signals C1 and C2, and luminance signal Y which are time-divisionally multiplexed. The small size suffixes in the figures $N, N+1 \ldots$ are numbers for each signal indicating the numerical order of each of signals Y, C1 and C2. A reference numeral "21" in FIG. 6 indicates a horizontal synchronizing signal.

Referring to FIG. 5, TCI decoder 17 comprises a first line memory 41 for luminance signal corresponding to channel A, a second line memory 42 for luminance signal corresponding to channel B and a line memory 44 for chrominance signal. Each of memories 41, 42 and 44 are capable of asynchronous writing and reading.

It is assumed that there are dropout sections at $C1_N$, $Y_N$ and $Y_{N+4}$ in the reproduced TCI signal of channel A provided from TBC 13 of FIG. 3, as shown in FIG. 6(a). Corresponding to these dropout sections, dropout pulses I, II and III of channel A are provided from TBC 13, as shown in FIG. 6 (b). It is also assumed that there are dropout sections at $C2_{N+1}$ and $Y_{N+3}$ in the reproduced TCI signal of channel B provided from TBC 14. Corresponding to these dropout sections, dropout pulses IV and V of channel B are provided from TBC 14, as shown in FIG. 6(d).

The above-mentioned TCI signal of channel A (FIG. 6 (a) and FIG. 7 (a)) and the dropout pulse of channel A (FIG. 6 (b)) provided from TBC 13 are stored in the first line memory 41 for luminance signal in TCI decoder 17. The above-mentioned TCI signal of channel B (FIG. 6 (c) and FIG. 7 (b)) and the dropout pulse of channel B (FIG. 6 (d)) provided from TBC 14 of FIG. 3 are stored second line memory 42 for luminance signal in TCI decoder 17.

According to the timing signal generated by timing generator 45 in response to TCI horizontal synchronizing signal, frame pulse $F_P$ and clock signal $R_{CK}$, luminance signals are read out alternately from the first and second line memories 41 and 42 for luminance signal, as shown in FIGS. 7 (c) and (d), and applied to a multiplexer 43 for luminance signal. The luminance signals applied to multiplexer 43 for luminance signal are mixed with each other as shown in FIGS. 6 (e) and 7 (e) to be supplied. According to the timing signal from timing generator 45, the dropout pulses of channels A and B are read out from the first and second line memories 41 and 42 for luminance signal, and mixed with each other by multiplexer 43 for luminance signal. That is to say, dropout pulses VI, VII and VIII for luminance signal corresponding to the above-mentioned dropout sections II, V and III (FIGS. 6 (b) and (d)) in luminance signal $Y_N$, $Y_{N+3}$ and $Y_{N+4}$ are provided from multiplexer 43 for luminance signal, as shown in FIG. 6 (f).

According to the timing signal from timing generator 45, chrominance signals C1 and C2 are read out from line memory 44 for chrominance signal, as shown in FIGS. 6 (g) and 7 (f), to be supplied. Also according to the timing signal from timing generator 45, dropout pulses corresponding to chrominance signals C1 and C2 are read out from line memory 44 for chrominance signal. That is to say, dropout pulses IX and X for chrominance signal corresponding to the above-mentioned dropout sections I and IV (FIGS. 6 (b) and (d)) in chrominance signals $C1_N$ and $C2_{N+1}$ are provided from line memory 44 for chrominance signal, as shown in FIG. 6 (h). In the above mentioned TCI decoder 17, data of 9 bits constituted by a video data of 8 bits and a dropout pulse of 1 bit is processed. Each of line memories 41, 42 and 44 implementing TCI decoder 17 has a 1 word 9-bit structure.

Figure 1:
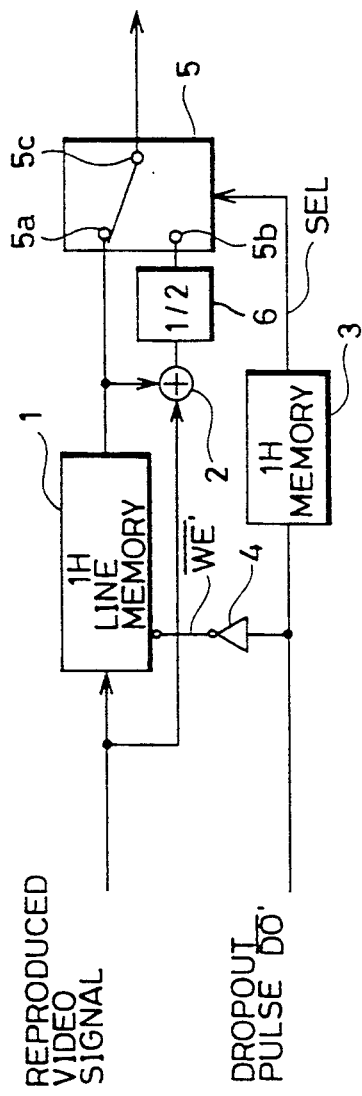
FIG. 1 is a block diagram showing a general dropout compensation circuit adopted in a conventional VTR.
Figure 8:
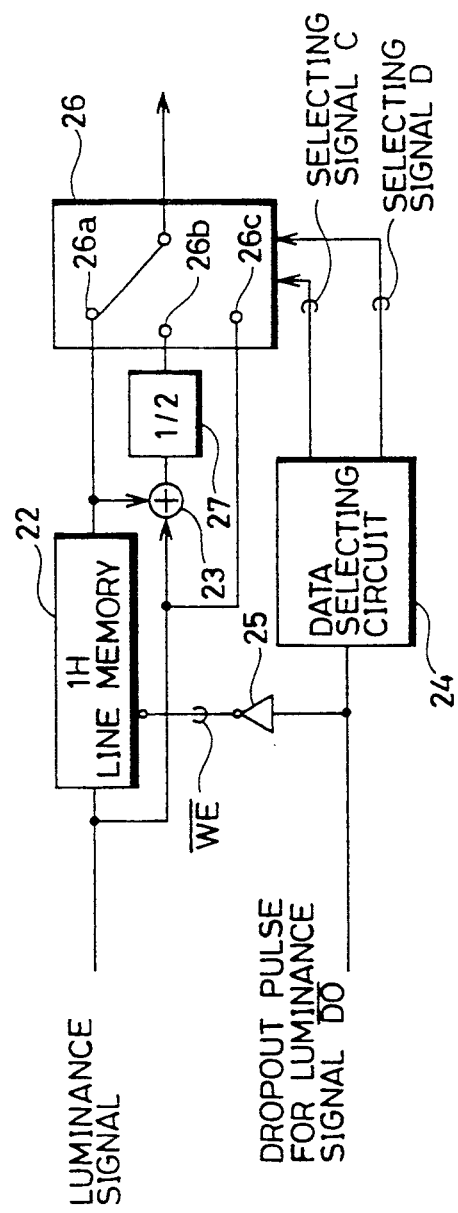
FIG. 8 is a block diagram showing the structure of a dropout compensation circuit for luminance signal of FIG. 3.

FIG. 8 is a block diagram showing in detail the structure of the dropout compensation circuit 18 for luminance signal of FIG. 3. Referring to FIG. 8, the luminance signal provided from TCI decoder 17 (FIGS. 6 (e) and 7 (e)) is applied to 1H line memory 22 and to one input of adder 23. The dropout pulse $\overline{DO}$ for luminance signal provided from TCI decoder 17 is applied to a data selecting circuit 24. Dropout pulse $\overline{DO}$ is also provided to an inverter 25 to be inverted and applied to 1H line memory 22 as a write enable signal $\overline{WE}$.

That is to say, during the period where dropout section does not exist in the reproduced luminance signal, signal $\overline{DO}$ is at H level, whereby signal $\overline{WE}$ attains the L level. Accordingly, the reproduced luminance signal of that period is written into 1H line memory 22. During the period where dropout section exists in the reproduced luminance signal, signal $\overline{DO}$ is at L level, whereby signal $\overline{WE}$ attains the H level. Accordingly, the writing of the reproduced luminance signal into 1H line memory 22 is inhibited during that period. Regarding the reproduced luminance signal written into 1H line memory 22, data of a period where dropout occurs is replaced with the data of a corresponding period in the reproduced luminance signal of 1H before held in 1H line memory 22. If there is dropout also in the luminance signal of 1H before, replacement will be performed again with the data of a corresponding period in a reproduced luminance signal of a preceeding horizontal period.

As stated before, the reproduced luminance signal is delayed by 1H by 1H line memory 22 and applied to one contact 26a of switch circuit 26 and to the other input of adder 23. Adder 23 adds the delayed luminance signal provided from 1H line memory 22 to the reproduced luminance signal currently provided, whereby the output amplitude thereof is divided by 2 by a divider 27.

This means that the average value of the two inputs of adder 23 is applied to contact 26b of switch circuit 26. The reproduced luminance signal currently provided from TCI decoder 17 is applied to contact 26c of switch circuit 26.

The data selecting circuit 24 is responsive to the dropout pulse for luminance signal from TCI decoder 17 to generate selecting signals C and D. These selecting signals are provided to the control inputs of switch circuit 26. According to these selecting signals, switch circuit 26 is connected to any of contacts 26a–26c, whereby any of the output of 1H line memory 22, the output of divider 27 and the currently reproduced luminance signal is supplied as luminance signal Y via switch circuit 26.

The switching operation by switch circuit 26 of FIG. 8 will be explained hereinafter.

Case 1

When there is no dropout in the luminance signal currently provided from 1H line memory 22, switch circuit 26 is switched to the side of contact 26a in response to selecting signals. As a result, a luminance signal delayed by 1H is directly provided from 1H line memory 22 via switch circuit 26.

Case 2

When there is dropout in the luminance signal currently provided from 1H line memory 22, and no dropout in the luminance signals of 1H before and 1H after thereof, switch circuit 26 is connected to the side of contact 26b in response to selecting signals. As a result, the average value of the signals of the corresponding sections in the luminance signals of horizontal periods 1H before and 1H after the horizontal period where dropout occurs is provided via switch circuit 26.

Case 3

When there are dropouts in the luminance signal currently provided from 1H line memory 22 and in the luminance signal of 1H before, and no dropout in the luminance signal of 1H after, switch circuit 26 is switched to the side of contact 26c in response to selecting signals. As a result, the luminance signal of 1H after the horizontal period where dropout occurs is provided via switch circuit 26.

Case 4

When there are dropouts in the luminance signal currently provided from 1H line memory 22 and in the luminance signal of 1H after, and no dropout in the luminance signal of 1H before, switch circuit 26 is connected to the side of contact 26a in response to selecting signals. As a result, the luminance signal from 1H line memory 22 is directly provided via switch circuit 26.

Case 5

When there are dropouts in the luminance signal currently provided from 1H line memory 22 and in the luminance signals of 1H before and also 1H after, switch circuit 26 is connected to the side of contact 26a in response to selecting signals. As a result, a luminance signal wherein the signal of the dropout period is replaced by a signal of a horizontal period of several Hs before where there are no dropouts is provided via switch circuit 26.

Thus, in accordance with an embodiment of the present invention, deterioration of picture quality at the time of dropout compensation can be prevented when there is dropout in the luminance signal currently provided from the 1H line memory, by detecting whether there are dropouts or not in the luminance signals of 1H before and 1H after, and substituting luminance signal data having the highest correlation with the current reproduced signal for luminance signal data of the period where dropout occurs.

The structure of the dropout compensation circuit 19 for chrominance signal that compensates for dropouts of line sequential processed chrominance signals C1 and C2 is substantially similar to that of the dropout compensation circuit 18 of FIG. 8. The dropout compensation circuit 19 is implemented with a 2H line memory instead of the 1H line memory 22 of FIG. 8, whereby each dropout section of each of signals C1 and C2 is replaced by data of each signal of 2H before and 2H after, or an average value of signals of corresponding sections in the chrominance signals in the horizontal periods 2H before and 2H after the horizontal period where dropout occurs. Only one system of dropout compensation circuit 19 for chrominance signal is required because chrominance signals are line sequential processed, as stated before.

Although a VTR for high definition television is taken as an example in the above embodiment, the present invention can be applied to video signal recording/reproduction devices using magnetic disc, optical disc and the like as the recording media of video signals.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal recording/reproduction device for recording and reproducing a 2-channel TCI signal obtained by time-divisionally multiplexing a luminance signal and a line sequential processed chrominance signal within one horizontal period, comprising:

means for reproducing a TCI signal for each channel from a recording medium, dropout detecting means for detecting the section where dropout occurs in the reproduced TCI signal of each channel to generate a dropout detection signal indicating the corresponding dropout section of each channel, time-base correcting means for time-base correcting the reproduced TCI signal of each channel and the corresponding dropout detection signal of each channel, decode means for decoding the reproduced, time-base corrected TCI signal of each channel to restore said luminance signal and said chrominance signal, and for decoding said time-base corrected dropout detection signal of each channel to generate a luminance dropout signal indicating a dropout section of a luminance signal and a chrominance dropout signal indicating a dropout section of a chrominance signal, luminance dropout compensation means responsive to said luminance dropout signal for compensating for the dropout section of said luminance signal restored by said decode means, and chrominance dropout compensation means responsive to said chrominance dropout signal for compensating for the dropout section of said chrominance signal restored by said decode means.

2. The video signal recording/reproduction device according to claim 1, wherein said time-base correcting means comprises A/D converting means for converting said reproduced TCI signal of each channel into a digital signal, means for synchronizing said dropout detection signal of each channel with said reproduced TCI signal of each channel, a first line memory (32) for time-base correcting said digital reproduced TCI signal of each channel, and a second line memory (34) for time-base correcting said dropout detection signal of each channel.

3. The video signal recording/reproduction device according to claim 1, wherein said decode means comprises third and fourth line memories provided for respective channels for holding the reproduced TCI signals and the time-base corrected dropout detection signals of the respective channels, means for reading out a luminance signals as a continuous luminance signal, means for reading out a dropout signal from said third and fourth line memories and for generating said luminance dropout signal corresponding to the dropout section of a luminance signal, a fifth line memory for holding the reproduced TCI signal and time-base corrected dropout detection signal of both channels, means for reading out said line sequential processed chrominance signal from said fifth line memory, and means for reading out a dropout detection signal from said fifth line memory for generating said chrominance dropout signal corresponding to the dropout section of said line sequential processed chrominance signal.

4. The video signal recording/reproduction device according to claim 1, wherein said luminance dropout compensation means comprises a 1H line memory for delaying said luminance signal restored by said decode means by 1 horizontal period, means responsive to said luminance dropout for inhibiting writing of said luminance signal into said 1H line memory in the dropout section of said luminance signal, means for averaging the input and output of said 1H line memory, and means responsive to said luminance dropout signal for selecting any of the output of said 1H line memory, the output of said averaging means and said luminance signal provided from said decode means, for providing a luminance signal which is dropout compensated.

* * * * *